United States Patent
Aoshima

[11] Patent Number: 6,125,240
[45] Date of Patent: Sep. 26, 2000

[54] CAMERA

[75] Inventor: Chikara Aoshima, Zama, Japan

[73] Assignee: Canon Kabushiki Kaisha, Tokyo, Japan

[21] Appl. No.: 08/453,805

[22] Filed: May 30, 1995

Related U.S. Application Data

[63] Continuation of application No. 08/288,261, Aug. 11, 1994, abandoned, which is a continuation of application No. 07/782,377, Oct. 24, 1991, abandoned.

[30] Foreign Application Priority Data

Oct. 25, 1990 [JP] Japan ................................ 2-285958
Nov. 14, 1990 [JP] Japan ................................ 2-306002

[51] Int. Cl.⁷ .................................................. G03B 17/24
[52] U.S. Cl. ............................................................ 396/320
[58] Field of Search ................................... 354/105, 106; 396/310, 311, 319, 320

[56] References Cited

U.S. PATENT DOCUMENTS

| | | | |
|---|---|---|---|
| 4,834,306 | 5/1989 | Robertson et al. | 242/71.1 |
| 4,947,196 | 8/1990 | Wash et al. | 354/76 |
| 4,977,419 | 12/1990 | Wash et al. | 354/76 |
| 5,016,030 | 5/1991 | Dwyer et al. | 354/21 |
| 5,023,635 | 6/1991 | Nealon | 354/76 |
| 5,028,940 | 7/1991 | Pearson | 354/75 |
| 5,136,318 | 8/1992 | Aoshima | 354/105 |
| 5,159,365 | 10/1992 | Takahashi et al. | 396/319 |
| 5,353,078 | 10/1994 | Aoshima | 354/105 |
| 5,742,858 | 4/1998 | Aoshima | 396/320 |
| 5,815,752 | 9/1998 | Tamamura et al. | 396/319 |

FOREIGN PATENT DOCUMENTS

| | | |
|---|---|---|
| 0433019 | 6/1991 | European Pat. Off. . |
| 267535 | 3/1990 | Japan . |
| 267536 | 3/1990 | Japan . |
| WO9004203 | 4/1990 | WIPO . |

*Primary Examiner*—Russell Adams
*Assistant Examiner*—Christopher Mahoney
*Attorney, Agent, or Firm*—Fitzpatrick, Cella, Harper & Scinto

[57] ABSTRACT

A camera includes a magnetic head for performing writing and/or reading of information on film. The magnetic head is movable between a position proximate the film (e.g., pressed to it) for performing a read/write operation and a position remote or withdrawn from the film. The camera further includes an operating member movable between a first position and a second position, such as a lens cover movable between a position covering the lens and a position uncovering the lens, and means for synchronizing, e.g., by mechanically interconnecting, movement of the magnetic head between the first and second position, and movement of the operating member between the first and second positions.

70 Claims, 10 Drawing Sheets

CAMERA

This application is a continuation of application Ser. No. 08/288,261 filed Aug. 11, 1994, now abandoned, which was a continuation of prior application Ser. No. 07/782,377 filed on Oct. 24, 1991, now abandoned.

BACKGROUND OF THE INVENTION

1. Field of the Invention

This invention relates to improvements in a camera using film with a magnetic recording portion and provided with a magnetic head for effecting the writing and/or reading of information on the magnetic recording portion of the film and an urging member for urging said magnetic head against the magnetic recording portion of said film.

2. Related Background Art

In recent years, a camera which uses film having a magnetic recording or memorizing portion and which is designed to write photographing information such as shutter speed, aperture value, date and title into said magnetic memorizing portion by a magnetic head, and read out said photographing information as required has been proposed in U.S. Pat. No. 4,977,419, etc.

Further, a camera designed such that a magnetic head writes information into the magnetic memorizing portion of film only when the film is advanced to the next frame after the exposure of one frame of the film is disclosed in WO90/04203 (PCT/US89/04343).

Now, to accurately accomplish the writing or reading of information on film with a magnetic memorizing portion by a magnetic head, it is necessary to make such structure that the magnetic head is urged against the magnetic memorizing portion of the film with some pressure and the magnetic head is positively brought into contact with the magnetic memorizing portion of the film. However, there has been the problem that if the magnetic head is in pressure contact with the film for a long time, the film will be deformed and strain will remain in the film to deteriorate the flatness of the film.

Also, as means for urging a magnetic head against the magnetic memorizing portion of film, there has been proposed a structure in which a pad made of rubber or the like is provided at a location opposed to the magnetic head and the film is pushed by said pad to thereby urge the magnetic memorizing portion of the film against the magnetic head, but again in such structure, there is a problem that if the pad pushes the film for a long time, the film will be deformed and though not so remarkably as in the above-described structure, strain will remain in the film to deteriorate the flatness of the film and in addition, there is the problem that the pad made of rubber or the like may stick to the film to make the subsequent feeding of the film difficult.

Also, in the above-described camera, said magnetic memorizing portion is disposed parallel to film supplying direction and at a predetermined location on the film, and coupled with an increase in the amount of information written and read out, it is necessary that the magnetic head be always positioned at said predetermined location on the film with good accuracy.

The applicant has previously filed a patent application which covers, as a camera suited for this, a camera of such structure that a magnetic head is secured and provided with a film platen movable perpendicularly to the direction of movement of film and pivotable on a plane parallel to the surface of the film and provided with a guide portion for regulating the position relative to the film in the widthwise direction thereof and said pressure plate is biased by a resilient member such as a spring to thereby urge said guide portion against a film edge thereof, thus enabling the magnetic head and the magnetic memorizing portion of the film to be positioned with good accuracy.

However, this camera also suffers from the problem that if the guide member is kept in pressure contact with the film edge for a long time, the film will be deformed and strain will remain in the film to deteriorate the flatness of the film.

SUMMARY OF THE INVENTION

One aspect of the application is to provide a camera having a head for effecting the recording of information onto film and/or the reading of information from the film and designed such that said head is shifted from a non-pressure contact state to a pressure contact state with respect to the film when the camera has been changed, by the operation of the operating member thereof, from a state in which the release operation is prohibited to a state in which the release operation is permitted.

One aspect of the application is to provide under the above object, a camera in which the changeover of the pressure contact and non-pressure contact states of the head with respect to the film is effected in operative association with the opening-closing of a lens barrier.

One aspect of the application is to provide, under the above object, a camera in which the changeover of the pressure-contact and non-pressure contact of the head with respect to the film is effected in operative association with the opening-closing of the main switch of the camera.

One aspect of the application is to provide a camera having said head and designed such that a position regulating member adapted to be brought into pressure contact with the film and position the film relative to the head is shifted from a non-pressure contact state to a pressure contact state when the camera has been changed from a state in which the release operation is prohibited to a state in which the release operation is permitted.

One aspect of the application is to provide, under the above object, a camera in which the changeover of the pressure contacts and non-pressure contact states of the position regulating member with respect to the film is effected in operative association with the opening-closing of the lens barrier.

One aspect of the application is to provide, under the above object, a camera in which the changeover of the pressure contact and non-pressure contact states of the position regulating member with respect to the film is effected in operative association with the opening-closing of the main switch.

Other objects of the present invention will become apparent from the following detailed description of some embodiments of the invention taken in conjunction with the accompanying drawings.

DETAILED DESCRIPTION OF THE PREFERRED EMBODIMENTS

Figure 1:
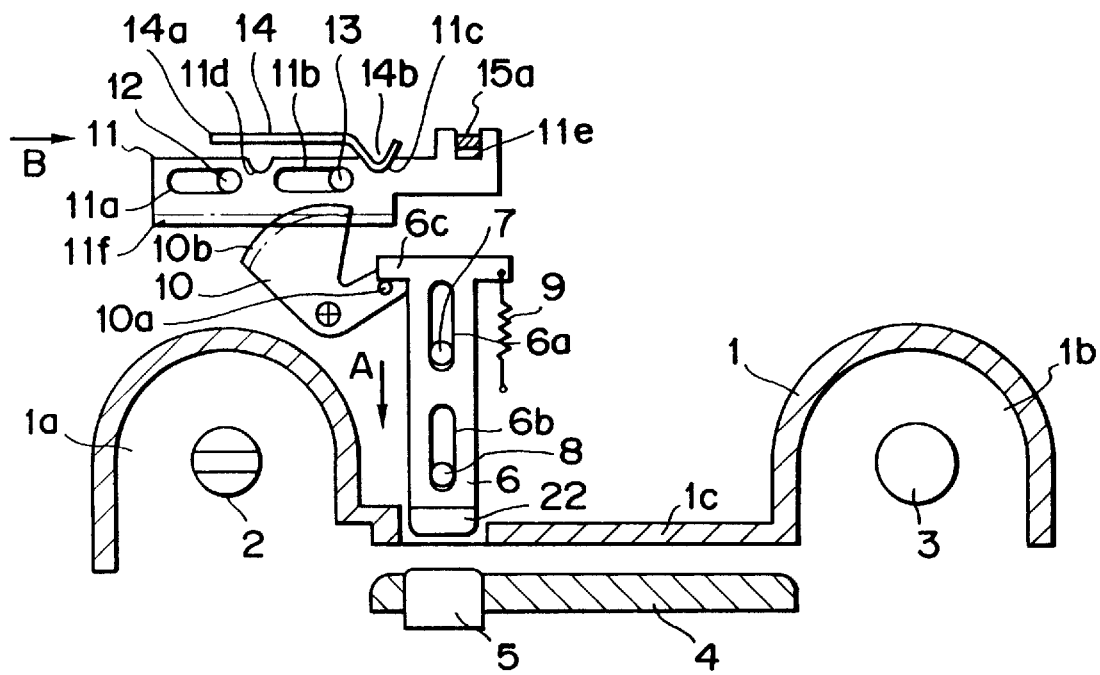
FIG. 1 is a transverse cross-sectional view of a camera according to a first embodiment of the present invention during a release prohibited state.
Figure 2:
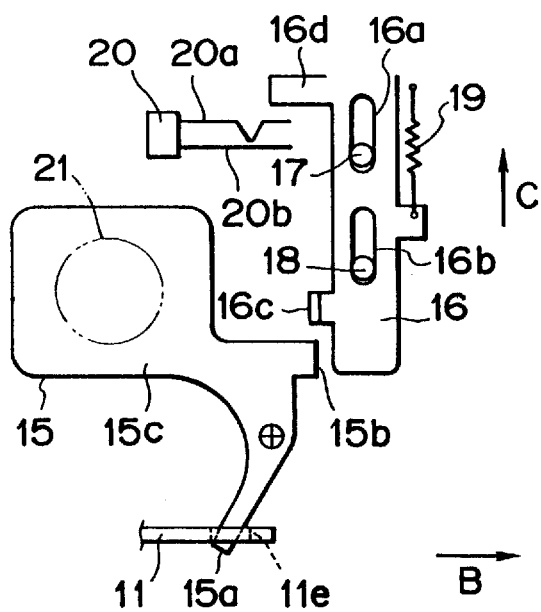
FIG. 2 is a plan view of a release operating member, etc. during the release prohibited state.
Figure 3:
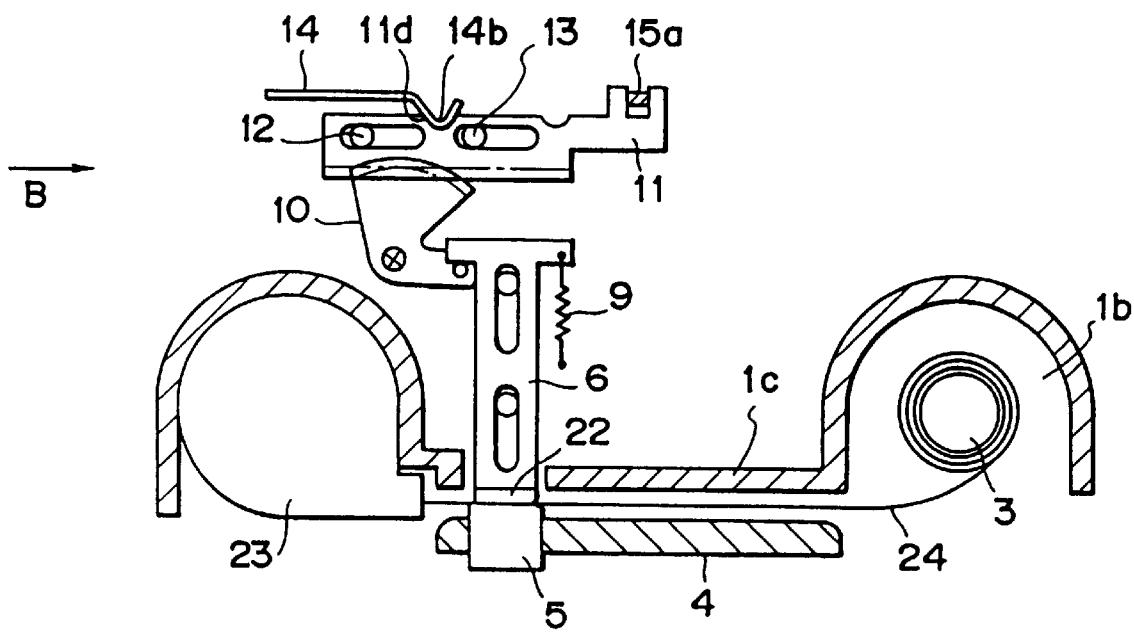
FIG. 3 is a transverse cross-sectional view of the camera during a release possible state.
Figure 4:
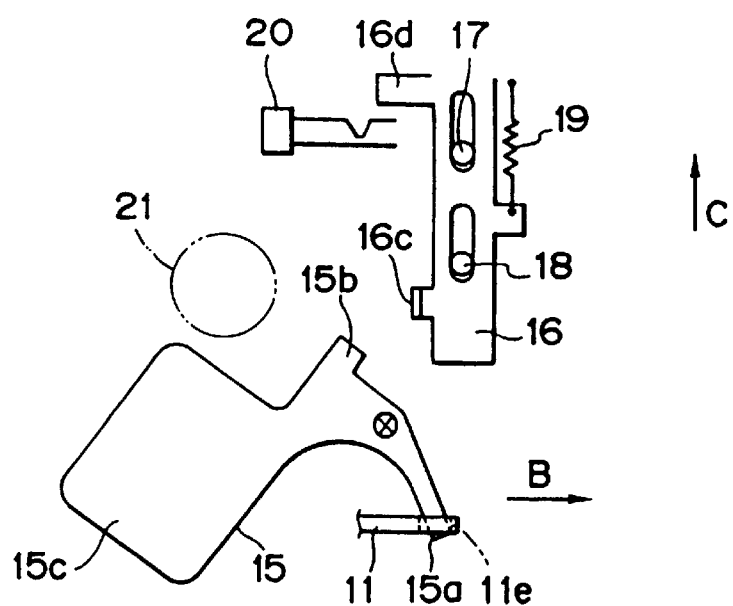
FIG. 4 is a plan view of the release operating member, etc. during the release possible state.

FIGS. 1 to 4 show a first embodiment of the present invention, FIG. 1 being a transverse cross-sectional view of a camera during a release prohibited state, FIG. 2 a plan view of a release operating member, etc. during the release prohibited state, FIG. 3 a transverse cross-sectional view of the camera during a release possible state, and FIG. 4 a plan view of the release operating member, etc. during the release possible state.

In FIGS. 1 and 3, the reference numeral 1 designates a camera body having a cartridge chamber 1a and a film take-up spool chamber 1b. The reference numeral 2 denotes a fork, and the reference numeral 3 designates a film take-up spool. The fork 2 engages with a film spool (not shown) in a film cartridge 23 (FIG. 3) proposed in U.S. Pat. No. 4,834,306, etc. and the film take-up spool 3 are driven by a film feeding mechanism known from Japanese Laid-Open Patent Application No. 2-67535, Japanese Laid-Open Patent Application No. 2-67536, etc. The reference numeral 4 denotes a film platen mounted on the camera body 1 or a back lid, not shown, with a predetermined distance kept from the film rail surface 1c of the camera body 1. The reference numeral 5 designates a. magnetic head for writing and/or reading information on the magnetic memorizing portion (not shown) of film 24. The magnetic head 5 is secured to the film platen 4. The reference numeral 6 denotes an urging lever having its slots 6a and 6b slidably fitted over shafts 7 and 8, respectively, provided in the camera body 1. The reference numeral 9 designates a spring for the urging lever 6 having one end thereof attached to the urging lever 6 and the other end thereof attached to the camera body 1 and biasing the urging lever 6 in the direction of arrow A. The reference numeral 22 denotes a pad attached to the urging lever 6 for pushing the film 24 to bring the magnetic memorizing portion of the film 24 into pressure contact with the magnetic head 5.

The reference numeral 10 designates a releasing lever pivotally mounted on the camera body 1. The pin 10a of the releasing lever 10 is engageable with the arm 6c of the urging lever 6, and the releasing lever 10 is formed with a gear portion 10b. The reference numeral 11 denotes an operating lever having its slots 11a and 11b slidably fitted over shafts 12 and 13, respectively, provided in the camera body 1. The operating lever 11 has a gear portion 11f meshing with the gear portion 10b of the releasing lever 10, and the releasing lever 10 and the operating lever 11 are operatively associated with each other. The reference numeral 14 designates a click leaf spring having one end 14a thereof fixed to the camera body 1 and the other end 14b thereof drops into V-shaped grooves 11c and 11d in the operating lever 11, thereby fixing the operating lever 11.

FIG. 2 is a plan view of parts as they are seen from the film surface side toward an object. The reference numeral 15 denotes a barrier member (a lens cover) pivotally mounted on the camera body 1 or a cover, not shown. The arm 15a of the barrier member 15 is fitted in a groove lie in the operating lever 11, and the barrier member 15 is rotated by the movement of the operating lever 11 (FIG. 2→FIG. 4). The reference numeral 16 designates a release lever having its slots 16a and 16b slidably fitted over shafts 17 and 18, respectively, provided in the camera body 1. The reference numeral 19 denotes a spring for the release lever 16 having one end thereof attached to the camera body 1 and the other end thereof attached to the release lever 16. The spring 19 biases the release lever 16 in the direction of arrow C in FIG. 2. The reference numeral 20 designates a release switch having their contact pieces 20a and 20b adapted to come into contact with each other to thereby start the release operation of the camera. The contact piece 20a is engageable with the arm 16d of the release lever 16. In the state of FIG. 2, even if an attempt is made to depress the release lever 16 in the direction opposite to the direction of arrow C against the biasing force of the spring 19 by manual operation, the rising portion 16c of the release lever 16 will bear against the stopper portion 15b of the barrier member 15. Any further movement of the release lever will be blocked and the arm 16d of the release lever 16 will not bear against the contact piece 20a. Therefore, the contact piece 20a will not come into contact with the contact piece 20b and thus, the release of the camera will not take place. The reference numeral 21 denotes the optical path of a photo-taking lens, not shown.

FIGS. 1 and 2 show a state in which the barrier portion 15c of the barrier member 15 covers and protects a photo-taking lens, not shown.

In the above-described construction, the film 24 is wound on the film take-up spool 3 by conventional means and photographing on each frame of the film 24 is effected, and when during the photographing, information is to be written or read on the film 24 by the magnetic head 5, it is necessary that the magnetic memorizing portion of the film 24 be brought into pressure contact with the magnetic head. However, if the film 24 is always urged against the magnetic head 5 by the pad 22, the film 24 will be deformed by the pressure of the pad and strain will remain in the film to deteriorate the planarity of the film 24 as already described.

So, in this embodiment, its design is made such that when as shown in FIGS. 1 and 2, the barrier member 15 is caused to cover the photo-taking lens, not shown, by the operating lever 11 and the barrier member 15 is in a position in which it blocks the depression of the release lever 16 to thereby prohibit release, that is, when the camera is not used, the urging of the film 24 by the pad 22 is prohibited so that no pressure may be applied to the film 24. That is, at this time, as shown in FIG. 1, the operating lever 11 is in its fixed state with the other end 14b of the click leaf spring 14 fallen into the V-shaped groove 11c, and consequently the releasing lever 10 does not rotate and the urging lever 6 is restrained in a position opposing the biasing of the spring 9, and as shown in FIG. 1, the pad 22 is in its retracted position with respect to the movement locus of the film.

When thereafter, the operating lever 11 is manually moved in the direction of arrow B to start photographing, the barrier member 15 is rotated counter-clockwise because the arm 15a thereof bits in the groove 11e in the operating lever 11, and the barrier portion 15c escapes outwardly from the optical path 21 of the photo-taking lens, not shown. Thereby, the stopper portion 15b of the barrier member 15 escapes out of the movement stroke of the rising portion 16c of the release lever 16. Therefore, the depression of the release lever in the direction opposite to the direction of arrow C becomes possible, and the release of the camera becomes possible. Also, as shown in FIG. 3, the releasing lever 10 rotates clockwise with the movement of the operating lever 11 in the direction of arrow B and the restraint of the arm 6c of the urging lever 6 by the pin 10a of the releasing lever 10 (in the position of FIG. 1) is released. Therefore, the urging lever 6 is moved in the direction of arrow A by the biasing force of the spring 9, and the pad 22 pushes the film 24 and brings the magnetic memorizing portion of the film 24 into pressure contact with the magnetic head 5. At this time, the operating lever 11 is held in a state as shown in FIG. 4 wherein the other end 14b of the click leaf spring 14 has fallen into the V-shaped groove 11d.

Summing up the above-described operation, the design is made such that in the state in which the camera is not used and the barrier member 15 is closed (the state in which release is blocked), no pressure is applied to the film 24 by the pad 22 to thereby prevent the deformation and strain of the film from remaining and that in the state in which the camera is used, that is, the barrier member 15 is opened (the state in which release is possible), the pad 22 is urged against the film 24 to thereby enable the writing or reading of information on the magnetic memorizing portion by the magnetic head to be accomplished accurately.

Figure 5:
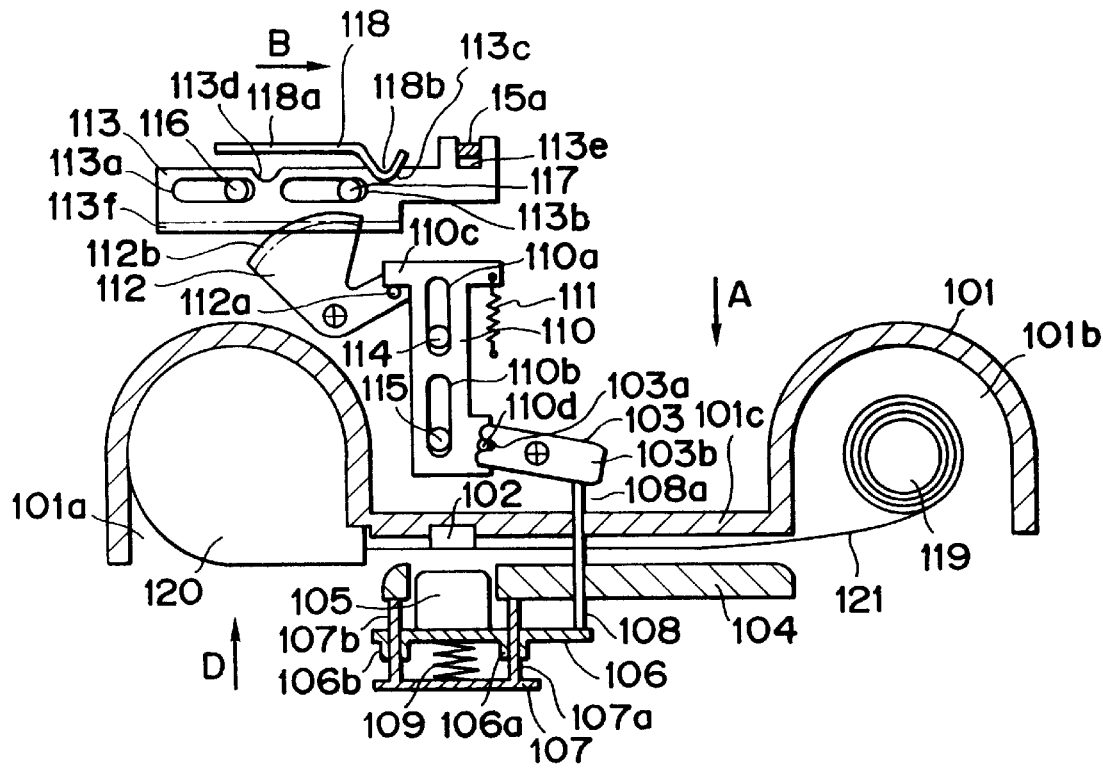
FIG. 5 is a transverse cross-sectional view of a camera according to a second embodiment of the present invention during a release prohibited state.
Figure 6:
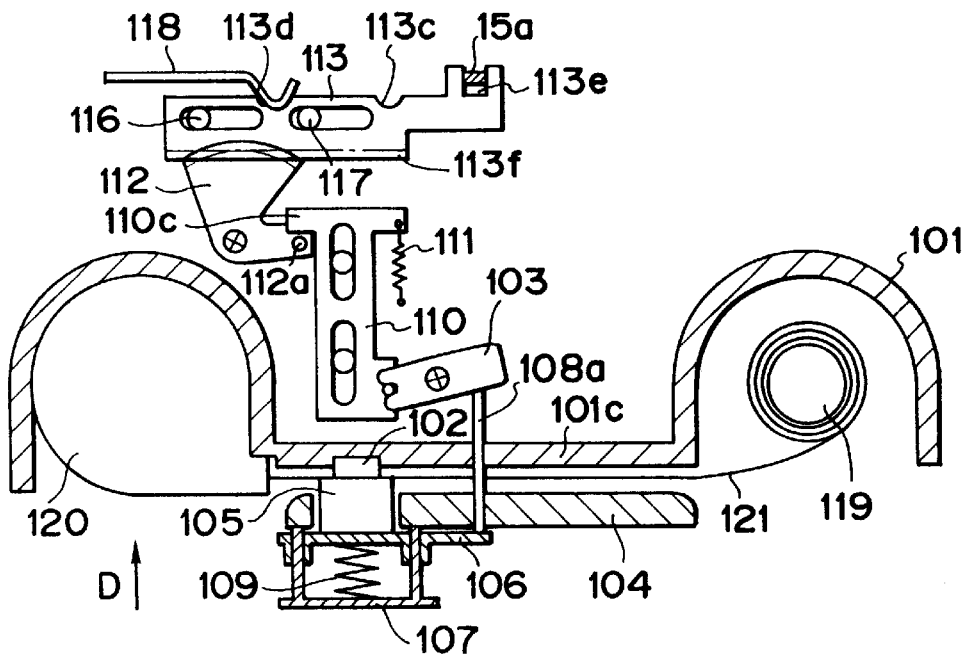
FIG. 6 is a transverse cross-sectional view of the camera during a release possible state.

FIGS. 5 and 6 show a second embodiment of the present invention in which the pad is fixed and the magnetic head is moved by the operation of the operating lever, FIG. 5 being a transverse cross-sectional view of a camera during a release prohibited state, and FIG. 6 being a transverse cross-sectional view of the camera during a release possible state. In this embodiment, the release operating member, etc. are similar to those in the first embodiment and therefore need not be shown and described.

In FIGS. 5 and 6, the reference numeral 101 designates a camera body having a cartridge chamber 101a and a film take-up spool chamber 101b. The reference numeral 102 denotes a pad secured to the camera body 101. The pad 102 serves to support film pushed by a magnetic head 105 which will be described later. The reference numeral 103 designates an interlocking lever rotatably mounted on the camera body 101, and the reference numeral 104 denotes a film platen mounted on the camera body 101 or a back lid, not shown, with a predetermined distance kept from a film rail surface 10c. The reference numeral 105 designates a magnetic head for writing and/or reading information on the magnetic memorizing portion (not shown) of the film, and the reference numeral 106 denotes a mounting plate to which the magnetic head 105 is secured. The reference numeral 107 designates a holding stand fixed to the film pressing plate 104. The sleeves 106a and 106b of the mounting plate 106 are slidably fitted to the shafts 107a and 107b, respectively, of the holding stand 107. The reference numeral 108 denotes a holding bar secured to the mounting plate 106 and having a tip end 108a which can bear against the arm 103b of the interlocking lever 103. The reference numeral 109 designates a compression spring for urging the magnetic head 105 and the mounting plate 106 in the direction of arrow D, i.e., toward the film surface.

The reference numeral 110 denotes an urging lever having the slots 110a and 110b thereof slidably fitted over shafts 114 and 115, respectively, provided in the camera body 101. The reference numeral 111 designates a spring for the urging lever 110 having one end thereof attached to the urging lever 110 and the other end thereof attached to the camera body 101 and biasing the urging lever 110 in the direction of arrow A. The spring 111 is slidably mounted on the camera body. The reference numeral 112 denotes a releasing lever pivotally mounted on the camera body 101. The pin 112a of the releasing lever 112 is engageable with the arm 110c of the urging lever 110, and the releasing lever 112 is formed with a gear portion 112b meshing with the gear portion 113fb of an operating lever 113 which will be described later, and rotates clockwise in response to the operating lever 113 being moved in the direction of arrow B, to thereby enable the urging lever 110 to be moved toward the film surface.

The reference numeral 113 designates an operating lever having its slots 113a and 113b slidably fitted over shafts 116 and 117, respectively, provided in the camera body 101. Similarly to the operating lever in the first embodiment, the arm 15a of a barrier member (not shown) is in engagement with a groove 113e in the operating lever 113. Consequently, in the position of FIG. 5, the release of the camera is prohibited, and when the operating lever is moved in the direction of arrow B and assumes its position as shown in FIG. 6, the release of the camera becomes possible. Also, the operating lever 113 has a gear portion 113f meshing with the gear portion 112b of the releasing lever 112 as previously described, and the releasing lever 112 and the operating lever 113 are operatively associated with each other.

The reference numeral 118 denotes a click leaf spring having one end 118a thereof fixed to the camera body 101, and the other end 118b of the click leaf spring 118 drops into V-shaped grooves 113c and 113d in the operating lever 113 to thereby fix the operating lever 113. The reference numeral 119 designates a film take-up spool, the reference numeral 120 denotes a film cartridge of the type described in connection with the first embodiment, and the reference numeral 121 designates film provided with a magnetic memorizing portion, not shown.

In the above-described construction, during the non-use of the camera when the barrier member, not shown, covers the optical path of a photo-taking lens (not shown), the other end 14b of the click leaf spring 14 drops into the V-shaped 113c in the operating lever 113 and therefore, the operating lever 113 is fixed in its state as shown in FIG. 5 and the releasing lever 112 does not rotate, and the urging lever 110 is restrained in a position opposing the biasing of the spring 111. Consequently, a state in which the arm 103b of the interlocking lever 103 pushes the tip end 108a of the holding bar 108 downwardly as viewed in FIG. 5 against the biasing force of the compression spring 109 is kept and therefore, the magnetic head 105 secured to the mounting plate 106 becomes retracted from the surface of the film 121 as shown in FIG. 5.

When thereafter, the operating lever 113 is manually moved in the direction of arrow B to start photographing, the barrier member escapes outwardly from the optical path of the photo-taking lens, not shown, as in the first embodiment. Therefore, the release of the camera becomes possible. Also, as shown in FIG. 6, the releasing lever 112 rotates clockwise with the movement of the operating lever 113 in the direction of arrow B and the urging lever 110 is moved in the direction of arrow A by the biasing force of the spring 9. Therefore, the interlocking lever 103 rotates counter-clockwise and the arm 103b thereof becomes positioned above as viewed in FIG. 5. Consequently, the holding bar 108 is moved in the direction of arrow D by the biasing force of the compression spring 109 and with this, the mounting plate 106 and the magnetic head 106 are also moved in the same direction and therefore, the magnetic head 105 assumes a state in which as shown in FIG. 6, it has urged the surface of the film 121 against the pad 102.

Figure 7:
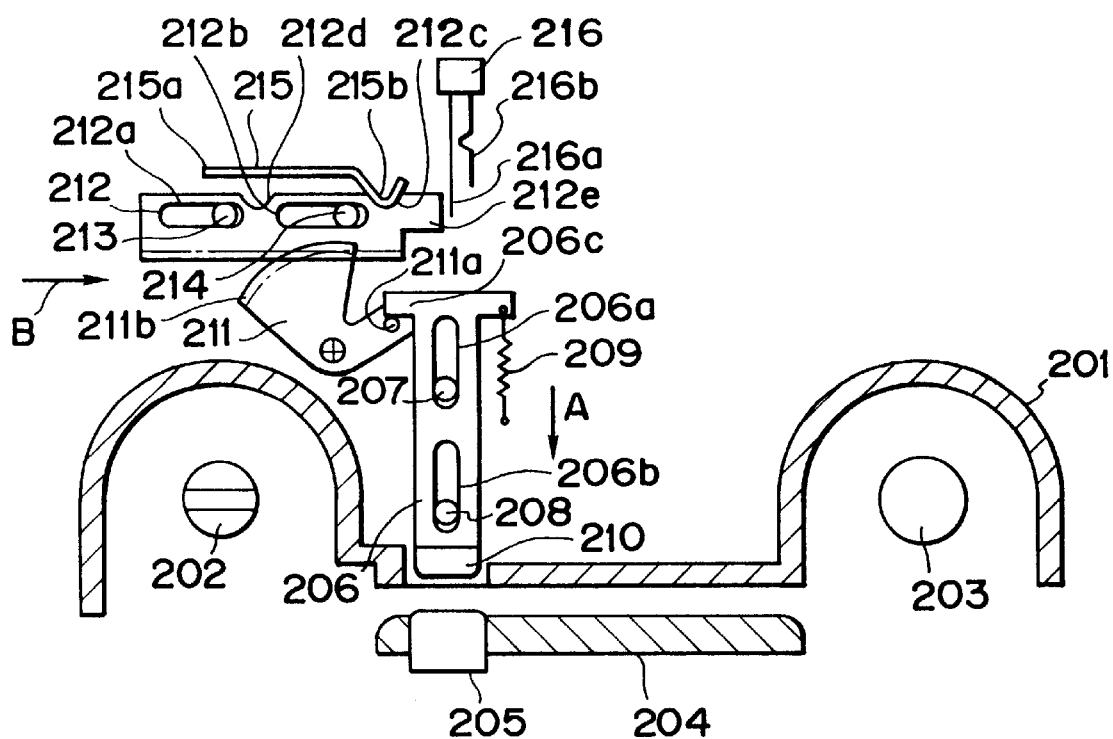
FIG. 7 is a transverse cross-sectional view of a camera according to a third embodiment of the present invention during the opening of a main switch.

FIG. 7 is a transverse cross-sectional view of a camera according to a third embodiment of the present invention when the main switch thereof is OFF.

In this figure, the reference numeral 201 designates a camera body, the reference numeral 202 denotes a fork, the reference numeral 203 designates a film take-up spool, the reference numeral 204 denotes film platen, the reference numeral 205 designates a magnetic head, and the reference numeral 206 denotes an urging lever having its slots 206a and 206b slidably fitted over shafts 207 and 208, respectively, provided in the camera body 201. The reference numeral 209 designates a spring for the urging lever 206 having one end thereof attached to the urging lever 206 and the other end thereof attached to the camera body 201, and biasing the urging lever 206 in the direction of arrow A. The reference numeral 210 denotes a pad attached to the urging lever 206.

The reference numeral 211 designates a releasing lever pivotally mounted on the camera body 201. The pin 211a of the releasing lever 211 is engageable with the arm 206c of the urging lever 206, and the releasing lever 211 is formed with a gear portion 211b. The reference numeral 212 denotes an operating lever having its slots 212a and 212b slidably fitted over shafts 213 and 214, respectively, provided in the camera body 201. The releasing lever 211 and the operating lever 212 are operatively associated with each other. The reference numeral 215 designates a clock leaf spring having one end 215a thereof fixed to the camera body. The other end 215b of the click leaf spring 215 drops into V-shaped grooves 212c and 212d in the operating lever 212 to thereby fix the operating lever 212. The reference numeral 216 denotes the main switch of the camera. By this switch being closed, the supply of electric power, for example, to a microcomputer as the control circuit of the camera is effected and the camera becomes operative. Thereby, the computer becomes capable of responding to a release switch operatively associated with the depression of a release button, not shown, and by the release switch being closed, the release of the camera is accomplished.

In the state of FIG. 7, contact pieces 216a and 216b are not in contact with each other and therefore the camera is in its inoperative state, and the camera will not be released even if the release operation is performed. Also, at this time, the operating lever 212 is in a state in which the other end 215b of the clock leaf spring 215 drops into the V-shaped groove 212c in the operating lever and is fixed thereby, and the releasing lever 211 does not rotate, and the urging lever 206 is restrained in its position opposing the biasing of the spring 209 and thus, as shown in FIG. 7, the pad 210 is retracted out of the movement locus of the film.

Also, when the operating lever 212 is manually moved in the direction of arrow B, the tip end 212e thereof brings the contact piece 216a into contact with the contact piece 216b to close the main switch 216, thus bringing about a release operation possible state. Also, with the movement of the operating lever 212 in the direction of arrow B, the releasing lever 211 rotates clockwise and the restraint of the arm 206c of the urging lever 206 by the pin 211a of the releasing lever 211 (in the position of FIG. 7) is released. Therefore, the urging lever 206 is moved in the direction of arrow A by the biasing force of the spring, 209 and the pad 210 pushes the surface of the film and brings the magnetic memorizing portion of the film into pressure contact with the magnetic head 205.

According to each of the above-described embodiments, in a state photographing is not effected with the barrier member being closed or the main switch being opened (a state in which the release operation is prohibited), the pressure contact between the magnetic head and the film is released, Therefore, the disadvantage that pressure is applied to the film for a long time, whereby the film is deformed and strain remains in the film to deteriorate the planarity of the film can be prevented. Moreover, the operating member such as the barrier member or the main switch and the urging member for the magnetic head and the film are operatively associated with each other and therefore, an expensive drive source such as a motor is unnecessary, and this leads to low costs.

Figure 8:
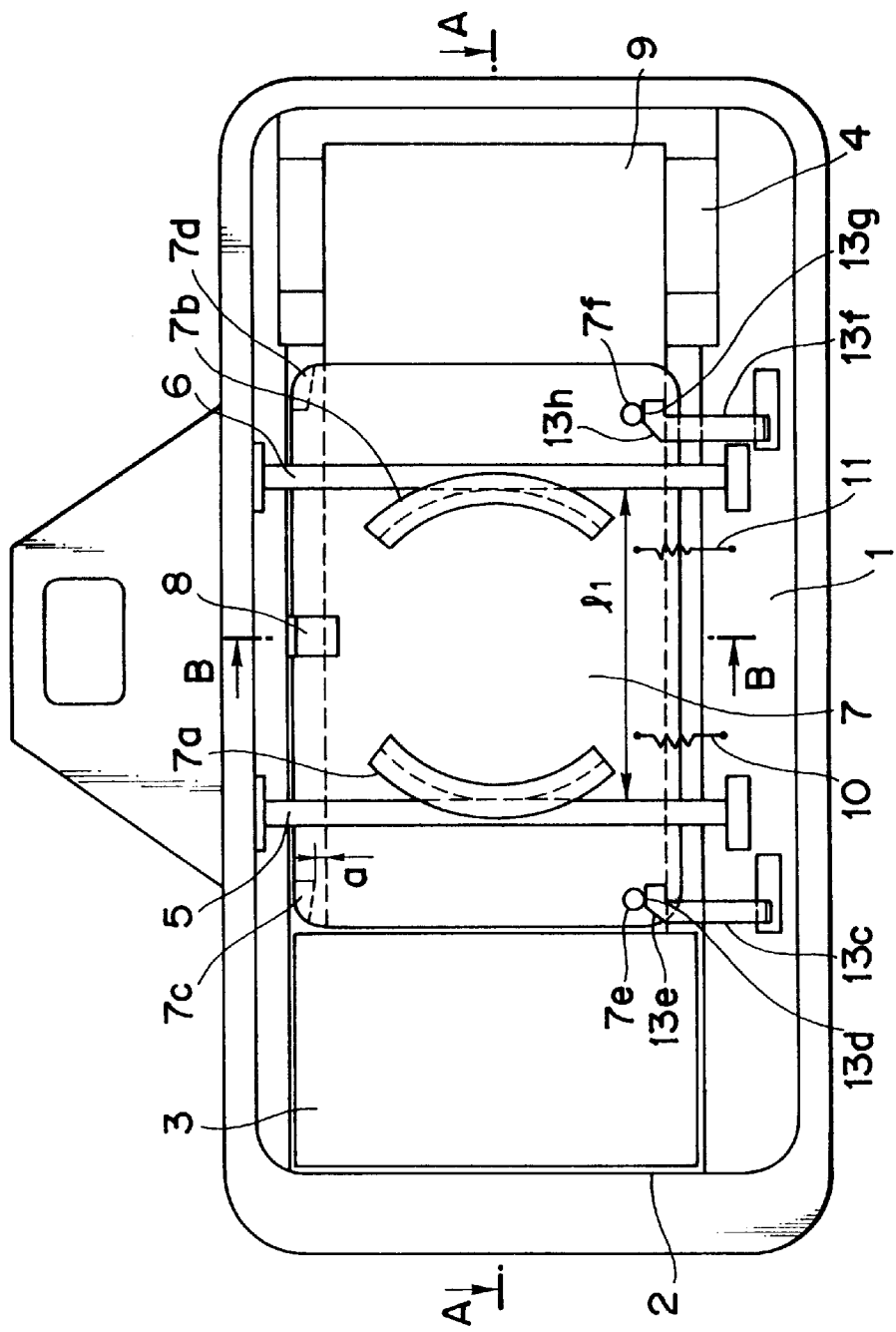
FIGS. 8 and 10 are rear views of a camera according to another embodiment of the present invention with the back lid thereof omitted.
Figure 9:
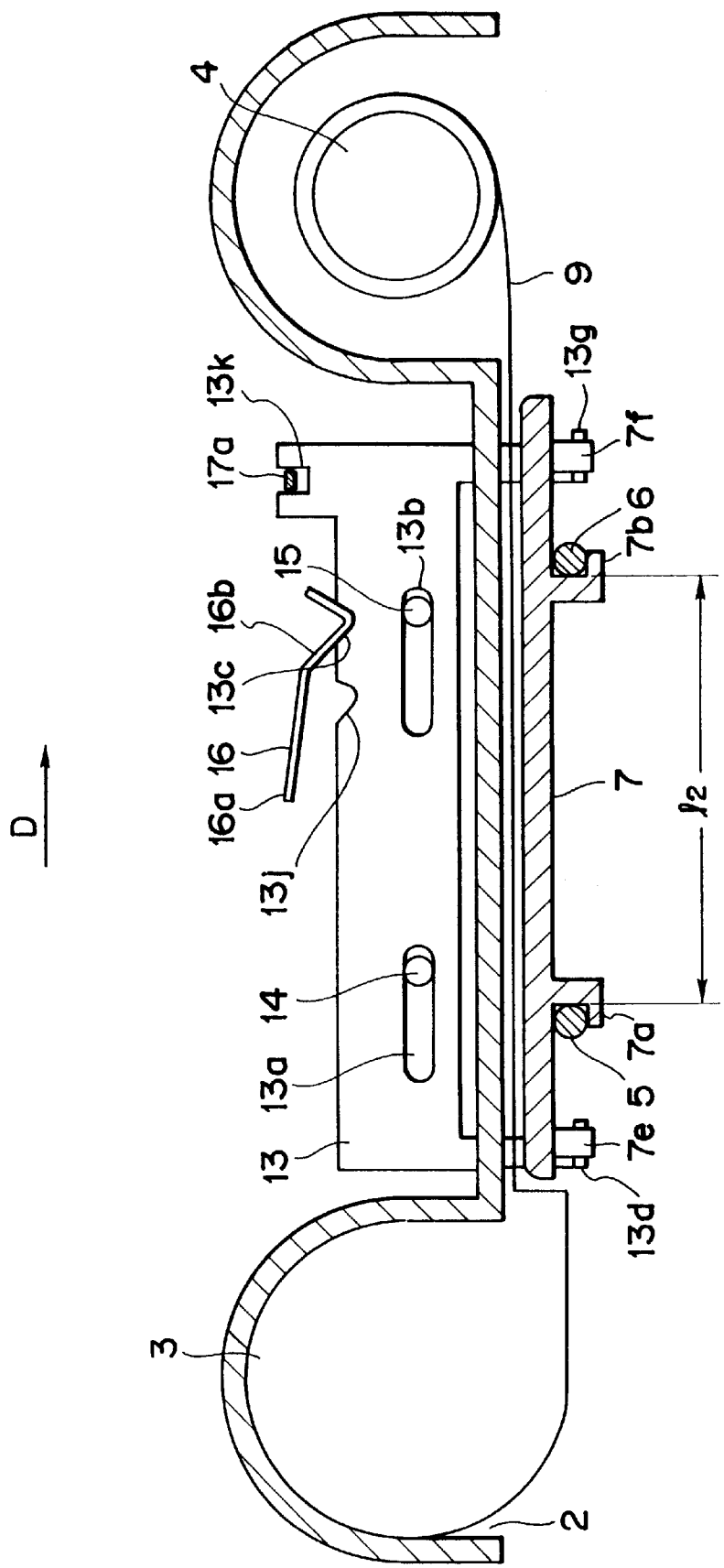
FIG. 9 is a cross-sectional view taken along line A—A of FIG. 8.
Figure 10:
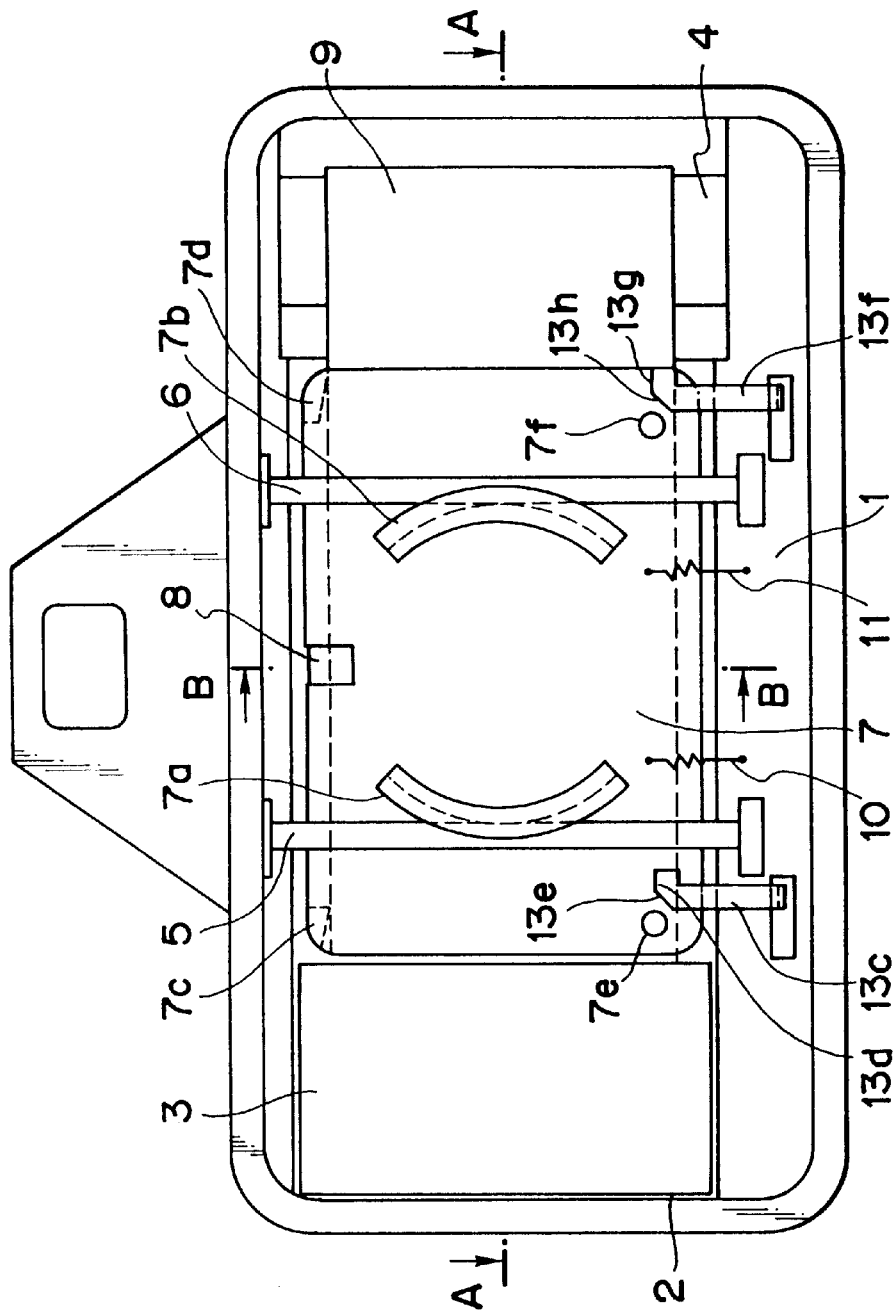
Figure 11:
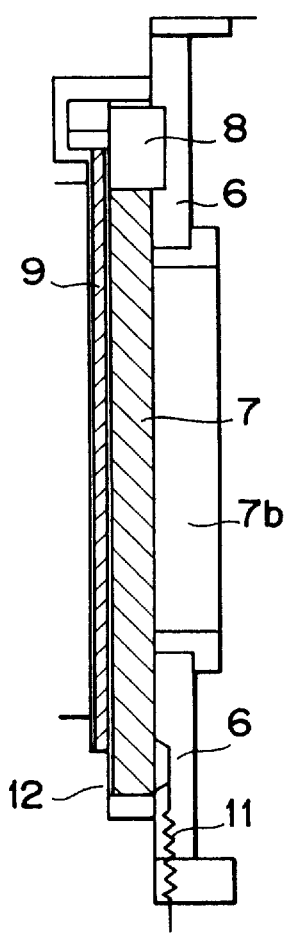
FIG. 11 is a cross-sectional view taken along line B—B of FIG. 8.

FIGS. 8 to 13 show another embodiment of the present invention; FIGS. 8 and 10 being rear views of a camera with the back lid thereof omitted, FIG. 9 being a cross-sectional view taken along line A—A of FIG. 8, FIG. 11 being a cross-sectional view taken along line B—B of FIG. 8, FIG. 12 being a plan view showing the positional relation of a release operating member, etc. in the release prohibited state of FIG. 8, and FIG. 13 being a plan view showing the positional relation of the release operating member, etc. in the release prohibited state of FIG. 10.

In these figures, the reference numeral 1 designates a camera body, the reference numeral 2 denotes a cartridge chamber for containing therein a film cartridge 3 which will be described later, the reference numeral 4 designates a film spool for taking up film 9, and the reference numerals 5 and 6 denote support shafts having their opposite ends secured to appropriate locations on the camera body 1. The support shafts 5 and 6 are parallel to each other and are disposed perpendicularly to the direction of movement of the film 9. The support shafts 5 and 6 in the present embodiment are of a pillar-like shape of circular cross-section as shown in FIG. 9.

The reference numeral 7 designates a film platen having a pair of restraining portions 7a and 7b provided on that surface thereof which is opposite to the surface thereof which bears against the film 9, as shown in FIG. 9. The restraining portions 7a and 7b each comprise a vertical portion perpendicular to the film platen 7 and a horizontal portion bent outwardly at a right angle from the vertical portion, thus presenting substantially an L-shape which as a whole protrudes toward the optical axis. The restraining portions 7a and 7b are disposed arcuately at symmetrical positions about the substantially central portion of the film platen 7, as viewed in the plan view of FIG. 8.

The distance $l_2$ (see FIG. 9) between the outer sides of the vertical portions of the restraining portions 7a and 7b are made somewhat shorter than the distance $l_1$ (see FIG. 8) between the inner sides of the support shafts 5 and 6 so that the support shafts 5 and 6 may be positioned in a concave space defined by the vertical and horizontal portions of the restraining portions 7a and 7b and the film platen 7. Accordingly, the film platen 7 is movable in a vertical direction in FIG. 8 (a direction perpendicular to the direction of movement of the film 9) relative to the support shafts 5 and 6 and is pivotable about the substantially central portion of the film platen 7. Also, the horizontal portions of the restraining portions 7a and 7b embrace the support shafts 5 and 6, respectively, as shown in FIG. 9, thus regulating the longitudinal position of the film platen 7 in the direction of the optical axis.

Also, guide members 7c and 7d are integrally provided on the upper two corners of the back of the film platen 7 and in addition, a magnetic head 8 is secured to an upper location on the back of the film platen 7 so that the magnetic gap of the magnetic head 8 may be perpendicular to the direction of movement of the film.

The reference numerals 10 and 11 denote springs which are urging means. The springs 10 and 11 are disposed on the cartridge chamber 2 side and the film spool 4 side, respectively, with the center of rotation of the film platen 7 interposed therebetween, and each of these springs has one end thereof secured to the camera body 1 and the other end thereof secured to the film platen 7, and biases the pressure plate 7 downwardly.

Thus, the guide members 7c and 7d provided on the film platen 7 are urged against a film edge so that the positional relation of the film platen 7 to the film 9 may always be constant. A magnetic memorizing portion (not shown) is formed horizontally on that surface of the film 9 which is adjacent to the film platen 7 in the lengthwise direction of the film so that various kinds of information regarding photographing may be written (or read) on the magnetic memorizing portion by the magnetic head 8.

The reference numeral 12 designates an outer rail (see FIG. 11) which regulates the downward position of the film 9. The reference numeral 13 denotes a releasing lever having its slots 13a and 13b slidably fitted over the shafts 14 and 15, respectively, of the camera body 1.

In the state of FIG. 8, the dowels 7e and 7f of the film platen 7 are restrained by the planar portions 13d and 13g, respectively, of the arms 13c and 13f of the releasing lever 13, and the film platen 7 is in its upwardly raised position. In this state, there is a gap a between the film edge and the guide portions 7c, 7d of the film platen, as shown in FIG. 8.

The reference numeral 16 denotes a click leaf spring having one end 16a thereof fixed to the camera body 1, and the other end 16b thereof drops into a V-shaped groove 13i or 13j in the releasing lever 13, and this click leaf spring has the function of fixing the releasing lever 13.

Figure 12:
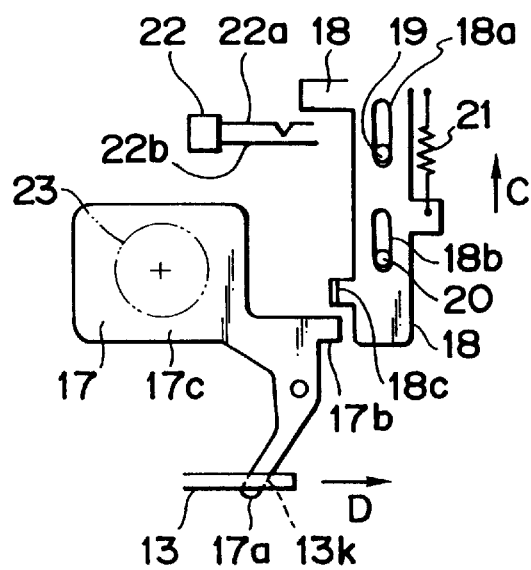
FIG. 12 is a plan view showing the positional relations of the release operating member, etc. in the release prohibited state of FIG. 8.
Figure 13:
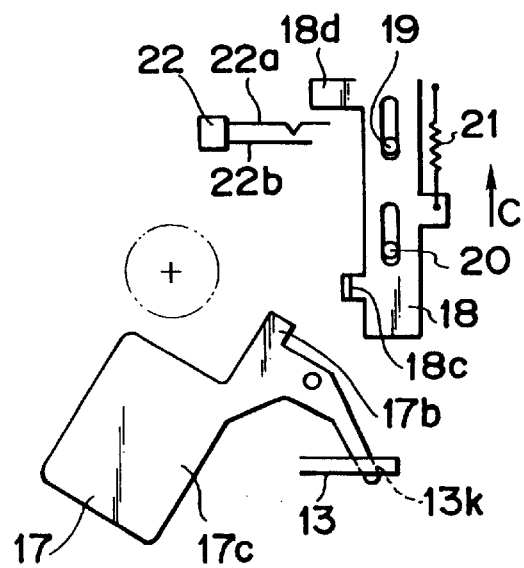
FIG. 13 is a plan view showing the positional relations of the release operating member, etc. in the release prohibited state of FIG. 10.

Referring to FIGS. 12 and 13 which are plan views showing the positional relations between various members when the object is seen from the surface side of the film 9, the reference numeral 17 designates a barrier member pivotally mounted on the camera body 1 or a camera cover, not shown. The arm 17a of the barrier member 17 is fitted (see FIG. 9) in a groove 13k in the releasing lever 13 and is rotated by the movement of the releasing lever 13. The reference numeral 18 denotes a release lever having its slots 18a and 18b slidably fitted over shafts 19 and 20, respectively, provided in the camera body 1. The reference numeral 21 designates a spring having one end thereof attached to the camera body 1 and the other end thereof attached to the release lever 18. The spring 21 biases the release lever 18 in the direction of arrow C. The reference numeral 22 denotes a release switch whose contact pieces 22a and 22b are adapted to come into contact with each other, whereby the release operation of the camera is started. The contact piece 22a is engageable with the arm 18d of the release lever 18.

In the state of FIG. 12, even if an attempt is made to depress the release lever 18 in the direction opposite to the direction of arrow C against the biasing force of the spring 21 by a manual operation, the rising portion 18c of the release lever 18 bears against the stopper portion 17b of the barrier member 17 and any further movement of the release lever is blocked, and the arm 18d of the release lever does not bear against the contact piece 22a. Therefore, the contact piece 22a does not contact with the contact piece 22b (the release switch 22 is not closed) and thus, the release of the camera is not effected.

The reference numeral 23 designates the optical path of a photo-taking lens, not shown.

FIGS. 8, 9, 11 and 12 show a state in which the barrier portion 17c of the barrier member 17 covers and protects the photo-taking lens, not shown, and prohibits the release of the camera.

During photographing, particularly during film feeding such as one frame advance of the film 9, when information is to be written or read onto or from the magnetic memorizing portion of the film 9 by the magnetic head 8, it is necessary to position the magnetic head 8 relative to the film 9 with good accuracy and for this purpose, the construction as described above, i.e., the construction in which the magnetic head 8 is secured and provision is made of the film platen 7 movable perpendicular to the direction of movement of the film 9 and having guide portions 7c and 7d for regulating the position relative to the film 9 in the widthwise direction thereof and the guide portions 7c and 7d of the film platen 7 are urged against the film edge 11 and the magnetic head 8 is positioned relative to the magnetic memorizing portion of the film 9 with good accuracy, becomes necessary. However, if such construction is simply adopted, the guide members 7c and 7d will be urged against the end surface of the film 9 for a long time, whereby as already described, the film 9 will be deformed and strain will remain in the film 9 to deteriorate the planarity of the film 9.

So, in the present embodiment, design is made such that in a state in which the release of the camera is prohibited, the pressure contact of the guide portions 7c and 7d with the film edge is released (see the gap a in FIG. 8) by the releasing lever 13 so that no pressure may be applied to the film.

When photographing is to be effected, if the releasing lever 13 is manually moved in the direction of arrow D (see FIGS. 8 and 12), the releasing lever 13 will become fixed at a position whereat the portion 16b of the click leaf spring 16 drops into a V-shaped groove 13j in the releasing lever 13. Also, when the releasing lever 13 is thus moved in the direction of arrow D, the barrier member 17 rotates counterclockwise as shown in FIG. 13 because the arm 17a of the barrier member 17 is fitted in a groove 13k in the releasing lever 13, and the barrier portion 17c is retracted from the optical path 23 of the photo-taking lens, not shown, and the stopper portion 17b escapes out of the stroke of the rising portion 18c of the release lever 18. Consequently, the depression of the release lever 18 in the direction opposite to the direction of arrow C becomes possible and thus, the release of the camera becomes possible.

On the other hand, when the release lever 13 is moved in the rightward direction, the engagement between the planar portions 13d, 13g thereof and the dowels 7e, 7f of the film platen is released and the film platen 7 is biased downwardly by the springs 10 and 11 and thus, the guide portions 7c and 7d come into pressure contact with the upper film edge. Thereby, the positioning of the magnetic head 8 and the film 9 is done and it becomes possible to accurately effect the reading or writing of information on the magnetic memorizing portion of the film 9 by the magnetic head 8.

To bring about a state in which photographing is not effected, the releasing lever 13 may be manually moved in the direction opposite to the direction of arrow B and returned to the position of FIG. 9. At that time, the ramp portions 13e and 13h of the arms 13c and 13f, respectively, of the releasing lever 13 come into engagement with the dowels 7e and 7f, respectively, of the film platen 7 to thereby raise the film platen 7 against the biasing forces of the springs 10 and 11, and soon the planar portions 13d and 13g bear against the dowels 7e and 7f, respectively, thus holding the pressure plate 7 in its raised position. Thus, the position shown in FIG. 9 has been restored.

Figure 14:
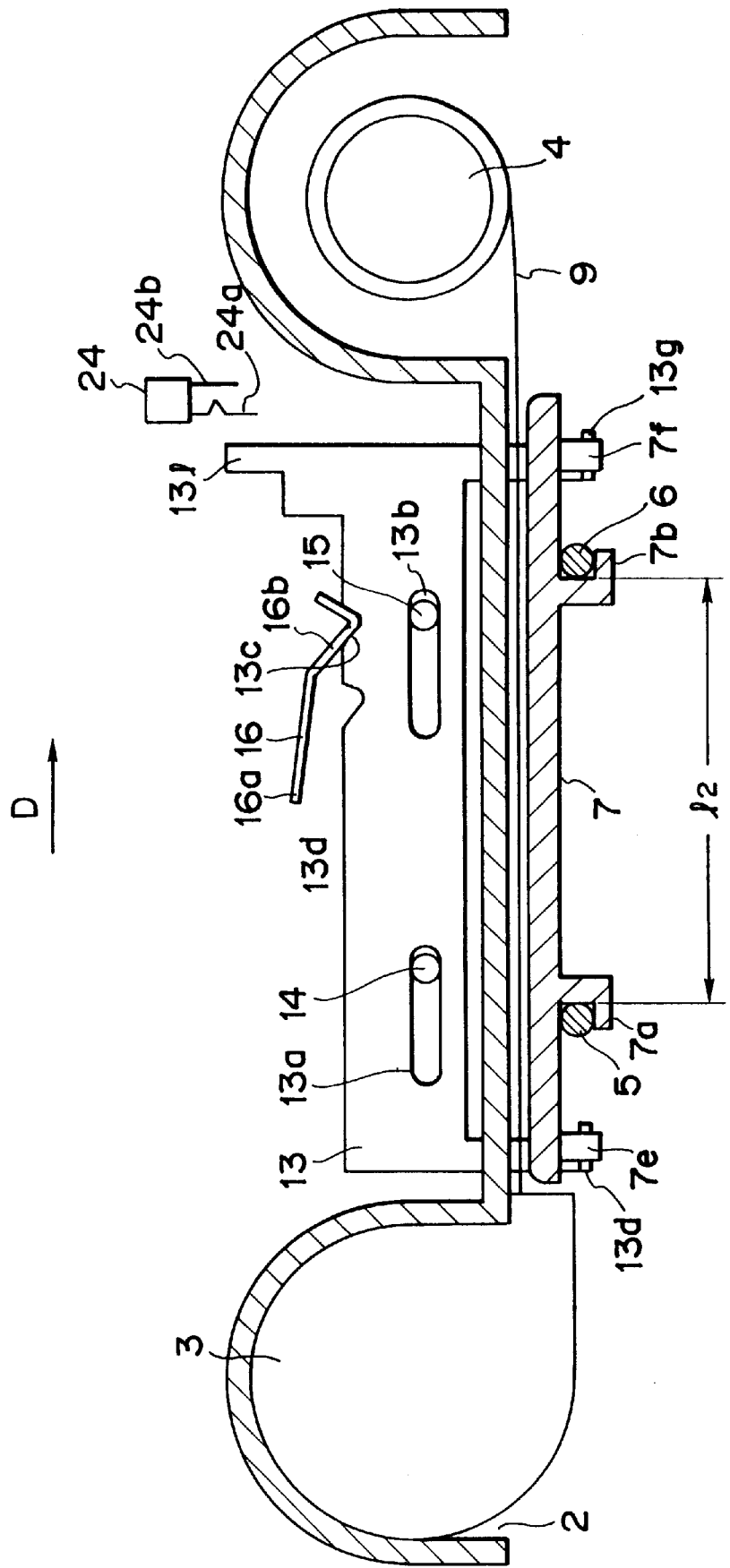
FIG. 14 is a transverse cross-sectional view of a camera according to another embodiment of the present invention during a release prohibited state.

FIG. 14 is a transverse cross-sectional view of a camera according to still another embodiment of the present invention. The reference numeral 24 designates a main switch comprising contact pieces 24a and 24b. By this switch being closed, the camera becomes operative as in the embodiment of FIG. 7, and by a release switch, not shown, being closed, the release of the camera is effected. A releasing lever 13 is functionally similar to the release lever shown in FIG. 9, but partly differs in shape from the latter. That is, it does not have the groove 13k and has a protruding portion 13l adapted to bear against the contact piece 24a of the main switch 24. In the other points, the construction of the releasing lever 13 is entirely similar to that shown in FIG. 9.

In the state of FIG. 14, the contact pieces 24a and 24b are not in contact with each other and therefore, the camera is in its inoperative state, and even if the release operation is performed, the camera will not be released. In this case, the guide members 7c and 7d are in a state in which they are not urging the end surface of the film 9 (a state similar to that of FIG. 8).

When from the state of FIG. 14, the releasing lever 13 is moved in the direction of arrow D, the guide members 7c and 7d press the end surface of the film 9 as in the aforedescribed embodiment of FIG. 8 and effects the positioning of the magnetic head 8 and the film 9 (a state similar to that of FIG. 10), and the protruding portion 132 of the releasing lever 13 bears against the contact piece 24a to deform it and bring the contact piece 24a into contact with the contact piece 24b, thus closing the main switch 24 and bringing the camera into a state in which photographing is possible.

Figure 15:
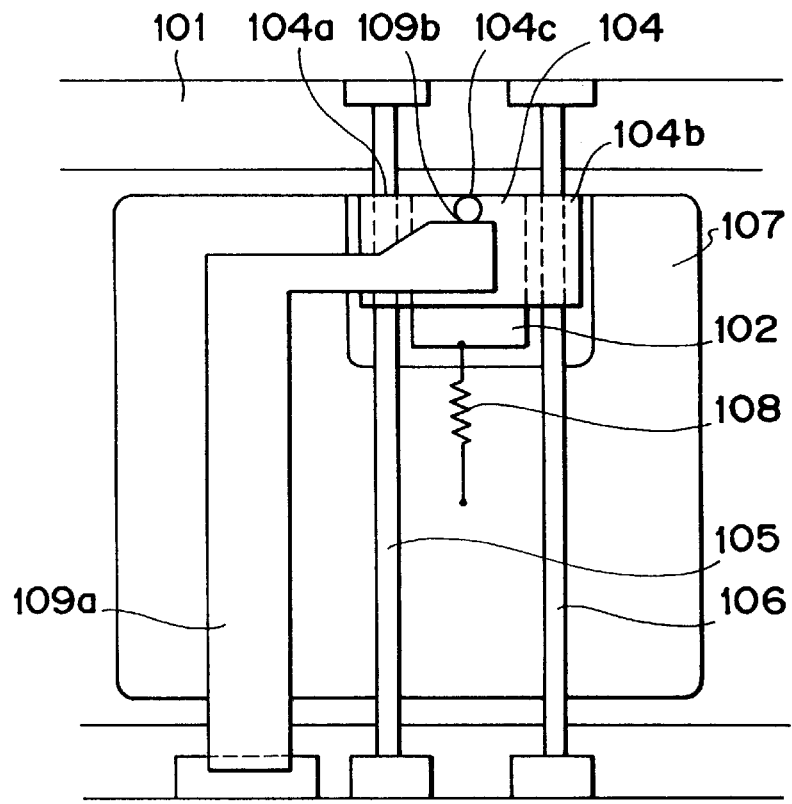
FIG. 15 is a rear view showing the construction of the essential portions of a camera according to another embodiment of the present invention.
Figure 16:
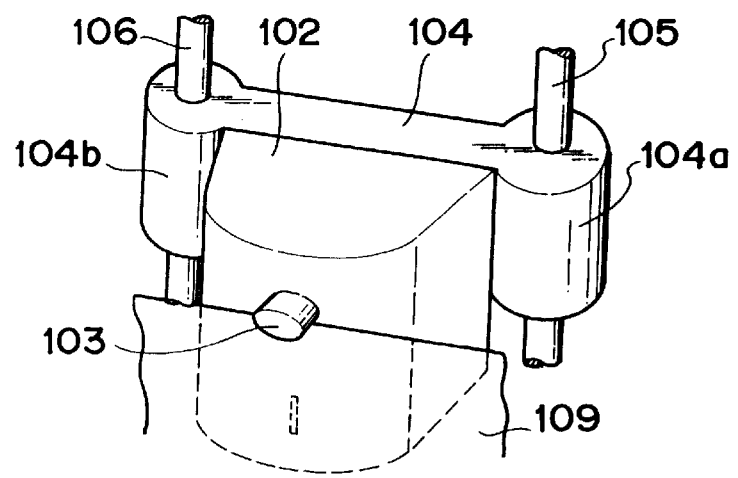
FIG. 16 is a perspective view showing the magnetic head and guide member of FIG. 15 on an enlarged scale.

FIGS. 15 and 16 show the construction of the essential portions of yet still another embodiment of the present invention. In this embodiment, a guide member is provided directly on a magnetic head, a film platen is secured to a camera body, and the magnetic head is made movable on the same plane perpendicularly to the direction of movement of film.

In these figures, the reference numeral 101 denotes the camera body, the reference numeral 102 designates the magnetic head, the reference numeral 103 denotes a film guide member secured to the magnetic head 102, and the reference numeral 104 designates a mounting plate to which the magnetic head 102 is secured.

The reference numerals 105 and 106 denote guide bars secured to the camera body 101, and the sleeves 104a and 104b of the mounting plate 104 are slidably fitted to these guide bars. Accordingly, the magnetic head 102 is also movable in the vertical direction.

The reference numeral 107 designates a film platen fixed to the camera body 101, and the reference numeral 108 denotes a spring having one end thereof fixed to the mounting plate 104 and the other end thereof fixed to the film platen 107, and biasing the mounting plate 104 downwardly.

The reference character 109a designates the arm of a releasing lever having structure like that of the lever 13 of FIG. 9. Similarly to FIG. 9, in the position in which the release of the camera is prohibited, as shown in FIG. 15, the planar portion 109b of the arm 109a is engaged with the dowel 104c of the mounting plate 104 to raise the mounting plate 104, the magnetic head 102 and the guide member 103 upwardly against the biasing force of the spring 108.

In a position wherein the release of the camera is possible, the releasing lever 109 is moved in the rightward direction, the engagement between the planar portion 109b and the dowel 104c of the mounting plate 104 is released, and the magnetic head 102 is biased downwardly by the spring 108. Therefore, the integrally provided guide member 103 bears against the film edge and the positioning of the magnetic head 102 and the film 110 is done. The state at this time is shown in FIG. 16.

According to each of the above-described embodiment, in a state in which photographing is not effected (the release operation is prohibited) such as the barrier member being closed or the main switch being opened, the pressure contact of the guide member with the end surface of the film is released, whereby it can be prevented that pressure is applied to the film for a long time and the film is deformed and strain remains in the film to deteriorate the planarity of the film.

Further, the structure in which the barrier member or the operating member such as the main switch is operatively associated with the urging means eliminates the necessity of providing any special drive source, and this leads to low costs.

What is claimed is:

1. A camera responsive to operation of a release operation member for performing a photographic operation, said camera comprising:

a film chamber;

a lid that covers said film chamber;

an information processing portion that performs at least one of recording of information onto a film and reading of information from the film, said information processing portion being pressed against the film to perform the recording and reading of information;

an operating member manually movable between a first position in which a photographic operation in response to operation of the release operation member is prohibited, and a second position in which a photographic operation in response to operation of the release operation member is permitted, said operating member being operable independent of operation of the release operation member and operation of said lid; and a synchronizing device that synchronizes movement of said information processing portion from a position out of contact with the film to a position in contact with the film with movement of said operating member from the first position to the second position.

2. A camera according to claim 1, wherein said information processing portion comprises:

a magnetic head, and an urging member, wherein said synchronizing device synchronizes movement of at least one of said magnetic head and said urging member to a position where the film is nipped between said magnetic head and said urging member with movement of said operation member from the first position to the second position.

3. A camera according to claim 2, wherein said synchronizing device holds at least one of said magnetic head and said urging member in a position where said magnetic head is not pressed against the film when said operating member is in the first position.

4. A camera according to claim 2, further comprising:

a cover member, which covers a photographing lens, wherein a photographic operation in response to operation of said operating member is prohibited when said cover member covers the photographing lens and a photographic operation in response to operation of said operating member is permitted when said cover member does not cover the photographing lens, said cover member being shiftable between a first position for covering the photographing lens and a second position at which the photographing lens is not covered, said cover member being shifted from the first position to the second position in accordance with operation of said operating member.

5. A camera according to claim 2, further comprising:

a control circuit, and a main switch that supplies electric power to said control circuit, the supply of electric power being prohibited when said main switch is in a first state and the supply of electric power being provided when said main switch is in a second state, said main switch being shifted from the first state to the second state in accordance with operation of said operating member.

6. A camera having a magnetic head portion for performing at least one of recording of information onto a magnetic recording medium and reading of information from said magnetic recording medium, said camera comprising:

a moving member movable between a first position where said moving member shields a photo-taking lens and a second position where said member does not shield the photo-taking lens; and a control device that synchronizes movement of the magnetic head portion and movement of said moving member, wherein, when said moving member is in said first position, said magnetic head portion is released from pressure contact with the recording medium, and when said moving member moves from the first position to the second position, said magnetic head portion is pressed against the magnetic recording medium.

7. A camera according to claim 6, wherein said control device comprises an urging member for nipping the magnetic recording medium between said urging member and said magnetic head portion, such that when said moving member moves to the first position, at least one of said head portion and said urging member moves to a position where the magnetic head portion is not pressed against the magnetic recording medium, and when said moving member moves from the first position to the second position, at least one of the magnetic head portion and said urging member moves to a position where the magnetic head portion is pressed against the magnetic recording medium.

8. A camera responsive to operation of a release operation member for performing a photographic operation, said camera comprising:

a film chamber;

a lid that covers said film chamber;

an information processing portion that performs at least one of recording of information onto a film and reading of information from the film, said information processing portion being pressed against the film to perform the recording and reading of information;

an operating member manually movable between a first position in which a photographic operation in response to operation of the release operation member is prohibited and a second position in which a photographic operation in response to operation of the release operation member is permitted, said operating member being operable independent of operation of the release operation member and operation of said lid;

a position regulating member that regulates the position of said information processing portion relative to a film edge, said position regulating member being movable between a first position where the position of said information processing portion is not adjacent to the film edge and a second position where the position of said information processing portion is adjacent to the film edge; and a synchronizing device that synchronizes movement of said position regulating member from the first position to the second position with movement of said operating member from the first position to the second position.

9. A camera according to claim 8, wherein said position regulating member comprises a guide member urged against the film edge.

10. A camera according to claim 8, wherein said information processing portion comprises a magnetic head and performs recording or reading of information on a magnetic recording portion provided on the film.

11. A camera according to claim 10, further comprising:

a cover member that is movable to cover a photographing lens, wherein a photographic operation in response to operation of said release operation member is prohibited when said cover member covers the photographing lens and a photographic operation in response to operation of said release operation member is permitted when said cover member does not cover the photographing lens, said cover member being movable between a first position for covering the lens and a second position at which the lens is not covered with operation of the operating member.

12. A camera according to claim 10, further comprising:

a control circuit, and a main switch that supplies electric power to said control circuit, the supply of electric power being prohibited when said main switch is in a first state and the supply of electric power being provided when said main switch is in a second state, said main switch being switchable between the first state and the second state in accordance with operation of said operating member.

13. A camera according to claim 8, wherein said operating member changes a state of a switch that supplies electric power to a control circuit of the camera.

14. A camera having a magnetic head portion for performing at least one of recording of information onto a magnetic recording film and reading of information from the magnetic recording film, said camera comprising:

a moving member movable between a first position where said moving member shields a photo-taking lens and a second position where said moving member does not shield the photo-taking lens; and a position regulating member that operates in synchronism with movement of said moving member and is adapted to be pressed against an edge of the magnetic recording film to thereby regulate the position of the magnetic head portion relative to the edge of the magnetic recording film, said position regulating member being released from contact with the edge of the magnetic recording film when said moving member is in said first position, and pressed against the edge of the magnetic recording film when said moving member is moved from said first position to said second position.

15. A camera adapted for use with a film having a magnetic memory portion, said camera comprising:

a film chamber;

a lid that covers said film chamber;

a magnetic head that performs at least one of writing information to and reading information from the magnetic memory portion of the film;

a disposing device that disposes said magnetic head in a state in which it performs at least one of writing information to and reading information from the magnetic memory portion of the film;

a first prevention device that selectively prevents a photographic operation of the camera said first preventing device being operable independent of said lid;

a second prevention device that prevents operation of said disposing device when said first prevention device prevents a photographic operation of the camera; and a starter device that starts a photographic operation, said starter device being manually operable, wherein operation of said first prevention device prevents a photographic operation from starting even if said starter device is manually operated.

16. A camera according to claim 15, wherein operation of said disposing device brings said magnetic head and the magnetic memory portion of the film into contact.

17. A camera according to claim 15, wherein operation of said second prevention device is mechanically interlocked with operation of said first prevention device.

18. A camera according to claim 15, wherein operation of said disposing device presses said magnetic head against the magnetic memory portion of the film.

19. A camera according to claim 15, wherein said disposing device comprises a nipping device that nips the magnetic memory portion of the film between said nipping device and said magnetic head, and operation of said disposing device moves said nipping device toward the magnetic memory portion of the film.

20. A camera according to claim 15, wherein said disposing device comprises a nipping device that nips the magnetic memory portion of the film between said nipping device and said magnetic head, and operation of said disposing device presses said nipping device against the magnetic memory portion of the film.

21. A camera according to claim 15, wherein said first prevention device comprises means for actuating a circuit for the photographic operation.

22. A camera according to claim 15, wherein said disposing device comprises a position regulating device that regulates a positional relationship between said magnetic head and the magnetic memory portion of the film.

23. A camera according to claim 22, wherein operation of said disposing device brings said position regulating device and the film into contact.

24. A camera according to claim 22, wherein operation of said disposing device urges said position regulating device against the film.

25. A camera according to claim 22, wherein operation of said disposing device urges said position regulating device against an edge of the film.

26. A camera according to claim 22, wherein said disposing device further comprises means for moving said position regulating device.

27. A camera adapted for use with a film having a magnetic memory portion, said camera comprising:

a film chamber;

a lid that covers said film chamber;

a magnetic head that performs at least one of writing information to and reading information from the magnetic memory portion of the film;

a disposing device that disposes said magnetic head in a state in which it performs at least one of writing information to and reading information from the magnetic memory portion of the film;

a first prevention device that selectively prevents a photographic operation of the camera, said first preventing device being operable independent of said lid; and a second prevention device that prevents operation of said disposing device when said first prevention device prevents a photographic operation of the camera, wherein operation of said disposing device moves said magnetic head toward the magnetic memory portion of the film.

28. A camera adapted for use with a film having a magnetic memory portion, said camera comprising:

a film chamber;

a lid that covers said film chamber;

a magnetic head that performs at least one of writing information to and reading information from the magnetic memory portion of the film;

a disposing device that disposes said magnetic head in a state in which it performs at least one of writing information to and reading information from the magnetic memory portion of the film;

a first prevention device that selectively prevents a photographic operation of the camera, said first preventing device being operable independent of said lid; and a second prevention device that prevents operation of said disposing device when said first prevention device prevents a photographic operation of the camera, wherein said first prevention device comprises means for protecting an optical unit.

29. A camera adapted for use with a film having a memory portion, said camera comprising:

a film chamber;

a lid that covers said film chamber;

a performing device that performs at least one of writing information to and reading information from the memory portion of the film;

a disposing device that disposes said performing device in a state in which it performs at least one of writing information to and reading information from the memory portion of the film;

a first prevention device that selectively prevents a photographic operation of the camera, said first preventing device being operable independent of operation of said lid;

a second prevention device that prevents operation of said disposing device when said first prevention device prevents a photographic operation of the camera; and a starter device that starts a photographic operation, said starter device being manually operable, wherein operation of said first prevention device prevents a photographic operation from starting even if said starter device is manually operated.

30. A camera according to claim 29, wherein operation of said disposing device brings said performing device and the memory portion of the film into contact.

31. A camera according to claim 29, wherein operation of said second prevention device is mechanically interlocked with operation of said first prevention device.

32. A camera according to claim 29, wherein operation of said disposing device presses said performing device against the memory portion of the film.

33. A camera according to claim 29, wherein said disposing device comprises a nipping device that nips the memory portion of the film between said nipping device and said performing device, and operation of said disposing device moves said nipping device toward the memory portion of the film.

34. A camera according to claim 29, wherein said disposing device comprises a nipping device that nips the memory portion of the film between said nipping device and said performing device, and operation of said disposing device presses said nipping device against the memory portion of the film.

35. A camera according to claim 29, wherein said first prevention device comprises means for actuating a circuit for the photographic operation.

36. A camera according to claim 29, wherein said disposing device comprises a position regulating device that regulates a positional relationship between said performing device and the memory portion of the film.

37. A camera according to claim 36, wherein operation of said disposing device brings said position regulating device and the film into contact.

38. A camera according to claim 36, wherein operation of said disposing device urges said position regulating device against the film.

39. A camera according to claim 36, wherein operation of said disposing device urges said regulating device against an edge of the film.

40. A camera according to claim 36, wherein said disposing device further comprises means for moving said position regulating device.

41. A camera adapted for use with a film having a memory portion, said camera comprising:

a film chamber;

a lid that covers said film chamber;

a performing device that performs at least one of writing information to and reading information from the memory portion of the film;

a disposing device that disposes said performing device in a state in which it performs at least one of writing information to and reading information from the memory portion of the film;

a first prevention device that selectively prevents a photographic operation of the camera, said first preventing device being operable independent of operation of said lid; and a second prevention device that prevents operation of said disposing device when said first prevention device prevents a photographic operation of the camera, wherein operation of said disposing device moves said performing device toward the memory portion of the film.

42. A camera adapted for use with a film having a memory portion, said camera comprising:

a film chamber;

a lid that covers said film chamber;

a performing device that performs at least one of writing information to and reading information from the memory portion of the film;

a disposing device that disposes said performing device in a state in which it performs at least one of writing information to and reading information from the memory portion of the film;

a first prevention device that selectively prevents a photographic operation of the camera, said first preventing device being operable independent of operation of said lid; and a second prevention device that prevents operation of said disposing device when said first prevention device prevents a photographic operation of the camera, wherein said first prevention device comprises means for protecting an optical unit.

43. An apparatus for a camera adapted for use with a film having a memory portion, the camera including a film chamber and a lid that covers the film chamber, said apparatus comprising:

a magnetic head that performs at least one of writing information to and reading information from the magnetic memory portion of the film;

a disposing device that disposes said magnetic head in a state in which it performs at least one of writing information to and reading information from the magnetic memory portion of the film;

a first prevention device that selectively prevents a photographic operation of the camera, said first prevention device being operable independent of operation of said lid;

a second prevention device that prevents operation of said disposing device when said first prevention device prevents a photographic operation of the camera; and a starter device that starts a photographic operation, said starter device being manually operable, wherein operation of said first prevention device prevents a photographic operation from starting even if said starter device is manually operated.

44. An apparatus according to claim 43, wherein operation of said disposing device brings said magnetic head and the magnetic memory portion of the film into contact.

45. An apparatus according to claim 43, wherein operation of said second prevention device is mechanically interlocked with operation of said first prevention device.

46. An apparatus according to claim 43, wherein operation of said disposing device presses said magnetic head against the magnetic memory portion of the film.

47. An apparatus according to claim 43, wherein said disposing device comprises a nipping device that nips the magnetic memory portion of the film between said nipping device and said magnetic head, and operation of said disposing device moves said nipping device toward the magnetic memory portion of the film.

48. An apparatus according to claim 43, wherein said disposing device comprises a nipping device that nips the magnetic memory portion of the film between said nipping device and said magnetic head, and operation of said disposing device presses said nipping device against the magnetic memory portion of the film.

49. An apparatus according to claim 43, wherein said first prevention device comprises means for actuating a circuit for the photographic operation.

50. An apparatus according to claim 43, wherein said disposing device comprises a position regulating device that regulates a positional relationship between said magnetic head and the magnetic memory portion of the film.

51. An apparatus according to claim 50, wherein operation of said disposing device brings said position regulating device and the film into contact.

52. An apparatus according to claim 50, wherein operation of said disposing device urges said position regulating device against the film.

53. An apparatus according to claim 50, wherein operation of said disposing device urges said position regulating device against an edge of the film.

54. An apparatus according to claim 50, wherein said disposing device further comprises means for moving said position regulating device.

55. An apparatus for a camera adapted for use with a film having a memory portion, the camera including a film chamber and a lid that covers the film chamber, said apparatus comprising:
- a magnetic head that performs at least one of writing information to and reading information from the magnetic memory portion of the film;
- a disposing device that disposes said magnetic head in a state in which it performs at least one of writing information to and reading information from the magnetic memory portion of the film;
- a first prevention device that selectively prevents a photographic operation of the camera, said first prevention device being operable independent of operation of said lid; and
- a second prevention device that prevents operation of said disposing device when said first prevention device prevents a photographic operation of the camera,
- wherein operation of said disposing device moves said magnetic head toward the magnetic memory portion of the film.

56. An apparatus for a camera adapted for use with a film having a memory portion, the camera including a film chamber and a lid that covers the film chamber, said apparatus comprising:
- a magnetic head that performs at least one of writing information to and reading information from the magnetic memory portion of the film;
- a disposing device that disposes said magnetic head in a state in which it performs at least one of writing information to and reading information from the magnetic memory portion of the film;
- a first prevention device that selectively prevents a photographic operation of the camera, said first prevention device being operable independent of operation of said lid; and
- a second prevention device that prevents operation of said disposing device when said first prevention device prevents a photographic operation of the camera,
- wherein said first prevention device comprises means for protecting an optical unit.

57. An apparatus for a camera adapted for use with a film having a memory portion, the camera including a film compartment and a lid that covers the film compartment, said apparatus comprising:
- a performing device that performs at least one of writing information to and reading information from the memory portion of the film;
- a disposing device that disposes said performing device in a state in which it performs at least one of writing information to and reading information from the memory portion of the film;
- a first prevention device that selectively prevents a photographic operation, said first prevention device being operable independent of said lid;
- a second prevention device that prevents operation of said disposing device when said first prevention device prevents a photographic operation; and
- a starter device that starts a photographic operation, said starter device being manually operable,
- wherein operation of said first prevention device prevents a photographic operation from starting even if said starter device is manually operated.

58. An apparatus according to claim 57, wherein operation of said disposing device brings said performing device and the memory portion of the film into contact.

59. An apparatus according to claim 57, wherein operation of said second prevention device is mechanically interlocked with operation of said first prevention device.

60. An apparatus according to claim 57, wherein operation of said disposing device presses said performing device against the memory portion of the film.

61. An apparatus according to claim 57, wherein said disposing device comprises a nipping device that nips the memory portion of the film between said nipping device and said performing device, and operation of said disposing device moves said nipping device toward the memory portion of the film.

62. An apparatus according to claim 57, wherein said disposing device comprises a nipping device that nips the memory portion of the film between said nipping device and said performing device, and operation of said disposing device presses said nipping device against the memory portion of the film.

63. An apparatus according to claim 57, wherein said first prevention device comprises means for actuating a circuit for the photographic operation.

64. An apparatus according to claim 57, wherein said disposing device comprises a position regulating device that regulates a positional relationship between said performing device and the memory portion of the film.

65. An apparatus according to claim 64, wherein operation of said disposing device brings said position regulating device and the film into contact.

66. An apparatus according to claim 64, wherein operation of said disposing device urges said position regulating device against the film.

67. An apparatus according to claim 64, wherein operation of said disposing device urges said position regulating device against an edge of the film.

68. An apparatus according to claim 64, wherein said disposing device further comprises means for moving said position regulating device.

69. An apparatus for a camera adapted for use with a film having a memory portion, the camera including a film compartment and a lid that covers the film compartment, said apparatus comprising:
- a performing device that performs at least one of writing information to and reading information from the memory portion of the film;
- a disposing device that disposes said performing device in a state in which it performs at least one of writing information to and reading information from the memory portion of the film;
- a first prevention device that selectively prevents a photographic operation, said first prevention device being operable independent of said lid; and a second prevention device that prevents operation of said disposing device when said first prevention device prevents a photographic operation, wherein operation of said disposing device moves said performing device toward the memory portion of the film.

70. An apparatus for a camera adapted for use with a film having a memory portion, the camera including a film compartment and a lid that covers the film compartment, said apparatus comprising:

a performing device that performs at least one of writing information to and reading information from the memory portion of the film;

a disposing device that disposes said performing device in a state in which it performs at least one of writing information to and reading information from the memory portion of the film;

a first prevention device that selectively prevents a photographic operation, said first prevention device being operable independent of said lid; and a second prevention device that prevents operation of said disposing device when said first prevention device prevents a photographic operation, wherein said first prevention device comprises means for protecting an optical unit.

* * * * *

UNITED STATES PATENT AND TRADEMARK OFFICE
CERTIFICATE OF CORRECTION

PATENT NO. : 6,125,240

DATED : September 26, 2000

INVENTOR(S): CHIKARA AOSHIMA

It is certified that error appears in the above-identified patent and that said Letters Patent is hereby corrected as shown below:

COLUMN 3:

Line 49, "are" should read --is--.

Line 56, "a." should read --a--.

COLUMN 4:

Line 22, "groove lie" should read --groove 11e--.

Line 33, "their" should read --its--.

COLUMN 5:

Line 14, "bits" should read --fits--.

Line 64, "surface 10c." should read --surface 101c.--.

COLUMN 7:

Line 14, "magnetic head 106" should read --magnetic head 105--.

UNITED STATES PATENT AND TRADEMARK OFFICE
CERTIFICATE OF CORRECTION

PATENT NO. : 6,125,240

DATED : September 26, 2000

INVENTOR(S): CHIKARA AOSHIMA

It is certified that error appears in the above-identified patent and that said Letters Patent is hereby corrected as shown below:

COLUMN 8:

Line 11, "spring, 209" should read --spring 209,--.

Line 16, "in a state" should read

--in a state in which--.

Line 20, "released," should read --released.--.

Line 64, "distance $l_2$" should read --distance $\ell_2$--.

Line 65, "are" should read --is--.

Line 66, "distance $l_1$" should read --distance $\ell_1$--.

COLUMN 11:

Line 43, "effects" should read --effect--.

Line 45, "portion 132" should read --portion 13$\ell$--.

UNITED STATES PATENT AND TRADEMARK OFFICE
CERTIFICATE OF CORRECTION

PATENT NO. : 6,125,240

DATED : September 26, 2000

INVENTOR(S): CHIKARA AOSHIMA

Page 3 of 3

It is certified that error appears in the above-identified patent and that said Letters Patent is hereby corrected as shown below:

<u>COLUMN 12</u>:

Line 25, "embodiment," should read --embodiments,--.

<u>COLUMN 15</u>:

Line 24, "camera" should read --camera,--.

Signed and Sealed this

Twenty-second Day of May, 2001

*Attest:*

NICHOLAS P. GODICI

*Attesting Officer*   Acting Director of the United States Patent and Trademark Office